(12) United States Patent
Jones et al.

(10) Patent No.: US 6,299,478 B1
(45) Date of Patent: Oct. 9, 2001

(54) ELASTIC LOCKING DEVICE FOR LOCKING TWO COMPONENTS TOGETHER

(75) Inventors: Dennis B. Jones, Orange; Rajagopalan Chandrasekhar, Huntington Beach, both of CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/599,064

(22) Filed: Jun. 21, 2000

(51) Int. Cl.[7] .................................................. H02B 1/01
(52) U.S. Cl. ........................................................ 439/571
(58) Field of Search ..................................... 439/567, 553, 439/554, 562, 565, 571, 78

(56) References Cited

U.S. PATENT DOCUMENTS

| | | | |
|---|---|---|---|
| 4,173,387 | * 11/1979 | Zell | 439/571 |
| 5,080,611 | * 1/1992 | Hypes | 439/567 |
| 5,254,016 | * 10/1993 | Ganthier | 439/567 |
| 6,056,596 | * 5/2000 | Etiembre | 439/752 |
| 6,183,285 | * 2/2001 | Szu | 439/327 |

* cited by examiner

Primary Examiner—Brian Sircus
Assistant Examiner—J. F. Duverne
(74) Attorney, Agent, or Firm—Wei Te Chung

(57) ABSTRACT

A locking device comprises a plug portion and a receptacle portion. The plug portion comprises a cylindrical body defining a central cavity. A plurality of ribs radially project from an outer periphery of the body. Each rib has an interface at a free edge thereof distant from the cavity. The receptacle portion comprises an outer wall defining a circular chamber therein. A protrusion protrudes upwardly from a bottom of the chamber to an opening thereof. A blind hole is defined in the protrusion and does not extend through an upper free end portion of the protrusion. A distance between the interfaces of two opposite ribs is slightly larger than a bore diameter of the chamber. The cavity has a bore diameter equal to an outer diameter of the protrusion. In assembly, the plug portion is inserted into the receptacle portion whereby the protrusion enters into the cavity and the ribs enter into the chamber. A side wall of the protrusion is clamped by the body of the plug portion and compressed toward the blind hole whereby the protrusion is securely retained in the cavity of the plug portion.

11 Claims, 4 Drawing Sheets

ELASTIC LOCKING DEVICE FOR LOCKING TWO COMPONENTS TOGETHER

BACKGROUND OF THE INVENTION

The present invention relates to an elastic locking device, and particularly to a locking device consisting of two components which lock together by compressingly fitting one component into another component to lock two devices together.

U.S. Pat. No. 5,080,611 discloses an electrical connector assembly which includes a first connector 120, a pair of first connector locking devices 122, a second connector 220, and a pair of second connector locking devices 222. The first and second connector locking devices 122, 222 can mount and secure the first and second electrical connectors 120, 220 to a printed circuit board 24. The printed circuit board 24 has a first surface 146, a second surface 246 and a pair of receiving apertures 56 defined through the printed circuit board 24 from the first surface 146 to the second surface 246. The first connector 120 is mounted to the first surface 146 of the printed circuit board 24 and includes a dielectric housing 26 having a pair of locking device receiving recesses 154 aligned with the corresponding apertures 56. The second connector 220 is mounted to the second surface 246 of the printed circuit board 24 and includes a dielectric housing 26 having a pair of locking device receiving recesses 254 also aligned with the corresponding apertures 56. The first and second locking devices 122, 222 each have a pair of spaced springs 72, 74 with barbs 84 formed thereon. The first and second connector locking devices 122, 222 are inserted into the respective locking device receiving recesses 154, 254 so that, when they are assembled, they will be perpendicular to each other. The springs 72, 74 of the first and second connector locking devices 122, 222 enter corresponding apertures 56 of the printed circuit board 24 with the barbs 84 biting into inner walls of the corresponding apertures 56. Thus, the first and second connectors 120, 220 are assembled to the circuit board 24. However, said electrical connector assembly requires extra locking devices 122, 222 to lock the two connectors 120, 220 to the printed circuit board 24. This increases material and assembly costs. In addition, the retaining force provided by the barbs 84 of the connector locking devices 122, 222 interferentially fitting with the corresponding apertures 56 is relatively small and the connectors 120, 220 may detach from the circuit board 24. U.S. Pat. No. 5,254,016 discloses another type securement used in the same application. Anyhow, an economical and reliable locking device is required to overcome the disadvantages of the prior art.

BRIEF SUMMARY OF THE INVENTION

An object of the present invention is to provide an elastic locking device integrally formed with two components which is easy to manufacture and assemble.

An electrical connector assembly of the present invention comprises a first connector and a second connector. A locking device comprises a plug portion formed on an end of the first connector and a receptacle portion formed on a corresponding end of the second connector. The plug portion comprises a cylindrical body defining a central cavity. A plurality of ribs radially project from an outer periphery of the body. Each rib has an interface at a free edge thereof distant from the cavity. The receptacle portion comprises an outer wall defining a circular chamber therein. A protrusion protrudes upwardly from a bottom of the chamber to an opening thereof. A blind hole is defined in the protrusion and does not extend through an upper free end portion of the protrusion. A distance between the interfaces of two opposite ribs is slightly larger than a bore diameter of the chamber. The cavity has a bore diameter the same as an outer diameter of the protrusion. In assembly, the plug portion of the first connector is inserted from one side of a printed circuit board through hole in the printed circuit board and into the receptacle portion of the second connector located on an opposite side of the printed circuit board, whereby the protrusion enters into the cavity and the ribs enter into the chamber. A side wall of the protrusion is clamped by the body of the plug portion and compressed toward the blind hole, whereby the protrusion is securely retained in the cavity of the plug portion. The plug portion of the first connector is locked with the receptacle portion of the second connector.

Other objects, advantages and novel features of the invention will become more apparent from the following detailed description of the present embodiment when taken in conjunction with the accompanying drawings.

DETAILED DESCRIPTION OF THE INVENTION

Figure 1:
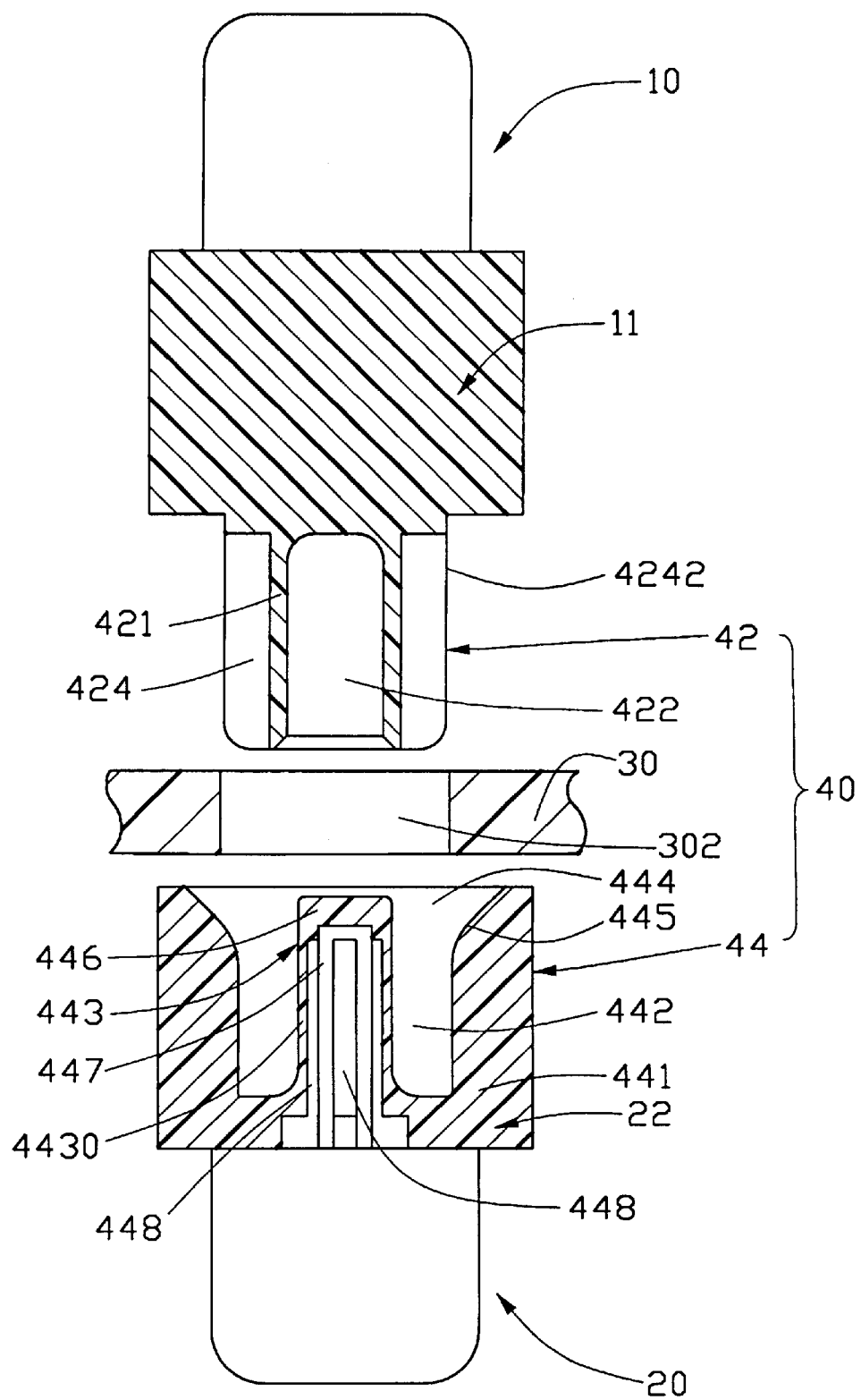
FIG. 1 is an exploded, cross-sectional view of an electrical connector assembly of the present invention and a printed circuit board.

Referring to FIG. 1, an electrical connector assembly incorporating a locking device of the present invention comprises a first connector 10 and a second connector 20. The two connectors 10, 20 are mounted to opposite faces of a printed circuit board 30. The locking device 40 comprises a plug portion 42 integrally formed on an end of a dielectric housing 11 of the first connector 10 and a receptacle portion 44 integrally formed on a corresponding end of a dielectric housing 22 of the second connector 20. The printed circuit board 30 defines a through hole 302. The locking device 40 is capable of locking the two connectors 10, 20 to the printed circuit board 30.

The plug portion 42 comprises a cylindrical body 421 defining a central cavity 422. A plurality of ribs 424 radially project from an outer periphery of the body 421. Each rib 424 has an interface 4242 at a free edge thereof distant from the cavity 422.

The receptacle portion 44 comprises an outer wall 441 defining a circular chamber 442 therein. A protrusion 443 protrudes upwardly from a bottom (not labeled) of the chamber 442 to an opening 444 thereof. The outer wall 441 has an incline 445 around the opening 444 of the receptacle portion 44. A blind hole 447 is defined in the protrusion 443. The blind hole 447 does not extend through an upper free end portion 446 of the protrusion 443. A plurality of grooves 448 is formed on an inner periphery of a side wall 4430 of the protrusion 443 which recess from the blind hole 447 whereby the protrusion 443 possesses a certain degree of resiliency. A distance between the interfaces 4242 of two opposite ribs 424 is slightly larger than a bore diameter of the chamber 442. The cavity 422 has a bore diameter equal to an outer diameter of the protrusion 443.

Figure 2:
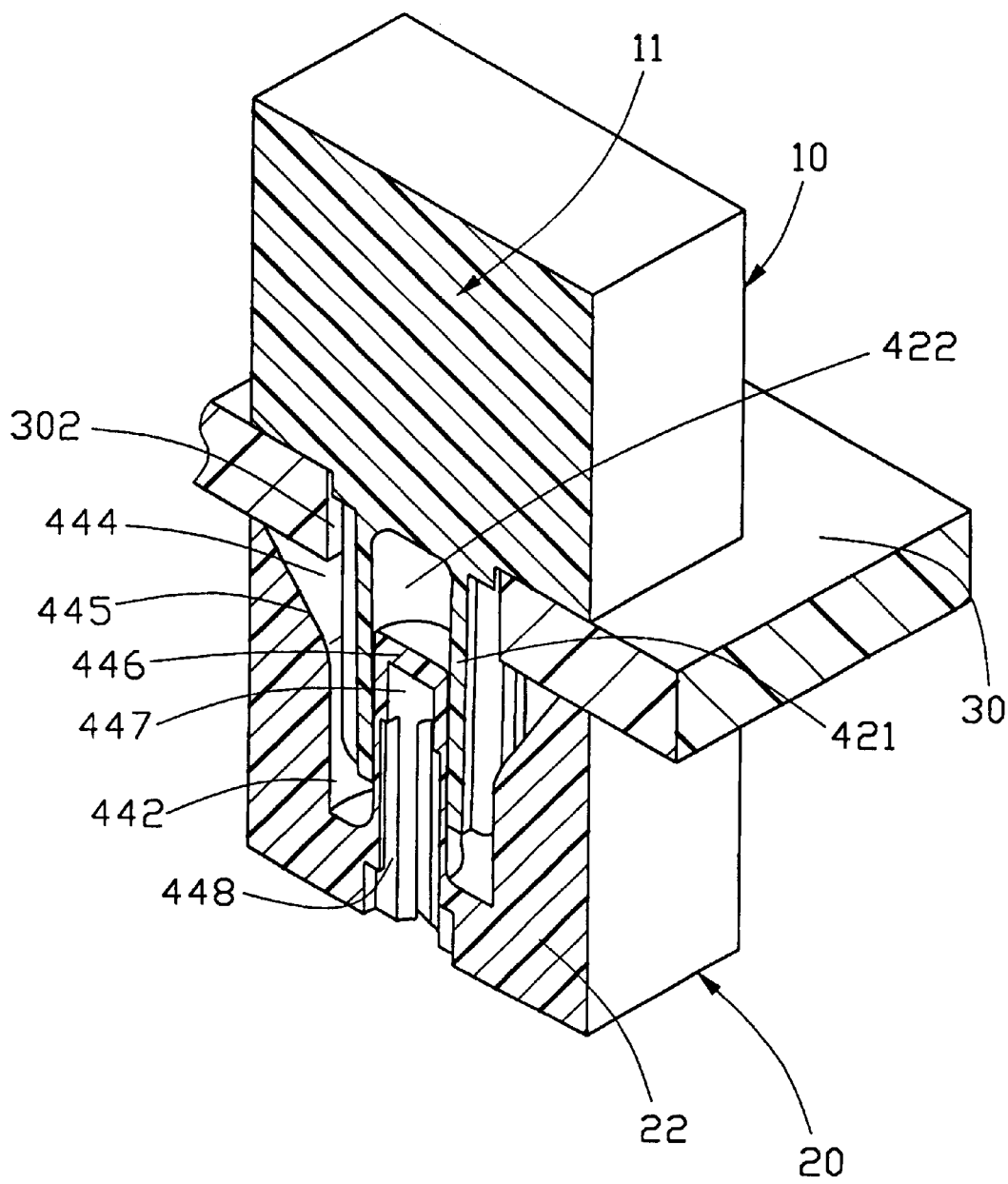
FIG. 2 is a fragmentary view showing a plug portion of a first connector shown in FIG. 1 locked with a receptacle portion of a second connector shown in FIG. 1.
Figure 3:
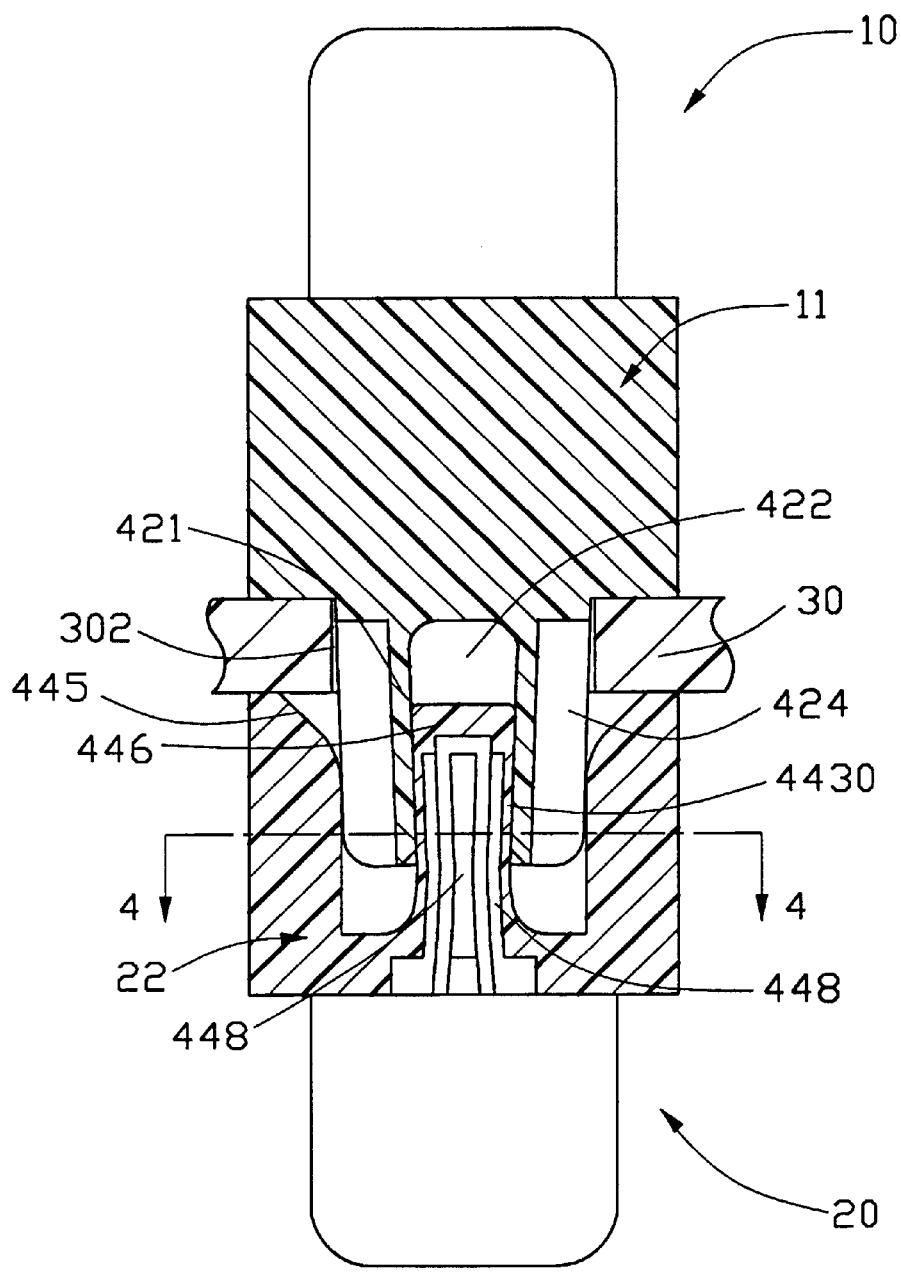
FIG. 3 is an assembled view of FIG. 1 showing the plug portion of the first connector locked with the receptacle portion of the second connector.
Figure 4:
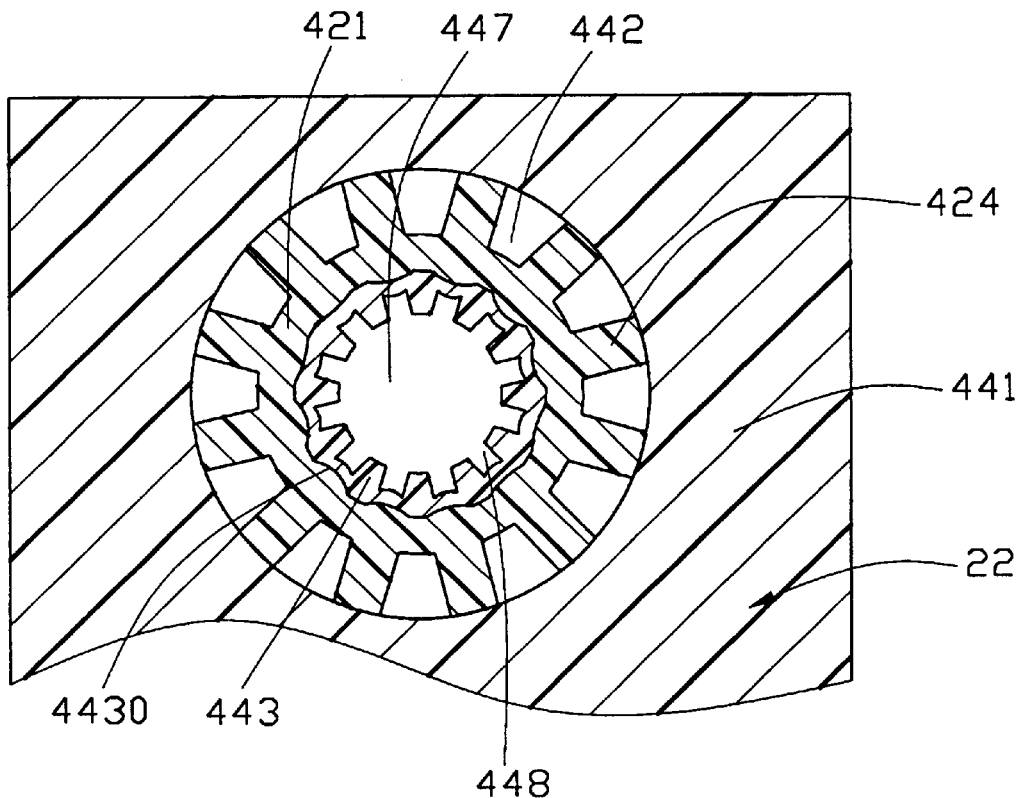
FIG. 4 is a cross-sectional and enlarged view taken from line 4—4 of FIG. 3.

Referring to FIGS. 2, 3 and 4, in assembly, the plug portion 42 of the first connector 10 is inserted through the through hole 302 of the printed circuit board 30 into the receptacle portion 44 of the second connector 20 via the opening 444 whereby the protrusion 443 enters into the cavity 422 and the ribs 424 enter into the chamber 442. Because the distance between the interfaces 4242 of two opposite ribs 424 is slightly larger than the bore diameter of the chamber 442, the ribs 424 together with the body 421 of the plug portion 42 are compressed inwardly by the outer wall 441 of the receptacle portion 44. Thus, the side wall 4430 of the protrusion 443 is clamped by the body 421 of the plug portion 42 and compressed toward the blind hole 447 whereby the protrusion 443 is securely retained in the cavity 422 of the plug portion 42. Accordingly, the plug portion 42 of the first connector 10 is locked with the receptacle portion 44 of the second connector 20 thereby securing the first and second connectors 10, 20 to the circuit board 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device formed integrally with a first device and a second device for locking said first and second devices together, comprising:
    a plug portion comprising a body defining a cavity therein, a plurality of ribs projecting from an outer periphery of the body, each rib having an interface at a free edge distant from the cavity;
    a receptacle portion comprising an outer wall defining a chamber therein, a protrusion protruding from the bottom thereof, a blind hole being defined in the protrusion and without extending through a free end portion of the protrusion, a distance between two interfaces of opposite ribs being slightly larger than a bore diameter of the chamber, the cavity having a bore diameter equal to an outer diameter of the protrusion;
    wherein the plug portion of the first connector is inserted into the receptacle portion of the second connector whereby the protrusion enters into the cavity and the ribs enter into the chamber, a side wall of the protrusion is clamped by the body of the plug and compressed toward the blind hole whereby the protrusion is securely retained in the cavity.

2. The locking device as claimed in claim 1, wherein a plurality of grooves is recessed from the inner side wall of the protrusion, communicating with the blind hole of the protrusion.

3. The locking device as claimed in claim 2, wherein the first device is a first connector and the second device is a second connector, the plug portion is formed on the first connector and the receptacle portion is formed on the second connector.

4. A connector and printed circuit board assembly, comprising:
    a printed circuit board comprising a first face, an opposite second face and a through hole between the first and second faces;
    a first connector mounted to the first face of the printed circuitboard and having a dielectric housing integrally formed with a receptacle portion, the receptacle portion defining a circular chamber which has a bore diameter, the receptacle portion having a protrusion in the chamber;
    a second connector mounted to the second face of the printed circuit board and having a dielectric housing integrally formed with a plug portion, the plug portion having a circular body and a cavity, a plurality of ribs radially projecting outward from the circular body, the plug portion extending through the through hole and compressedly received in the receptacle portion with the ribs being compressedly received in the chamber and the protrusion being clamped in the cavity to fixedly engage with the receptacle portion whereby the first and second connectors are fixed to the printed circuit board.

5. The assembly in accordance with claim 4, wherein the chamber has a widened opening through which the plug portion is received in the receptacle portion.

6. The assembly in accordance with claim 4, wherein the protrusion upwardly extends from a bottom of the chamber and has a blind hole therein which does not extend through an upper free end portion of the protrusion.

7. The assembly in accordance with claim 6, wherein the protrusion has a side wall defining a plurality of grooves in an inner periphery thereof which recess from the blind hole, whereby the protrusion possesses a certainly degree of resiliency.

8. An assembly comprising:
    first and second devices respectively back to back positioned on two opposite sides of a board;
    said board defining a through hole;
    said first device including a plug portion, said plug portion including a radially shrinkable body defining a cavity therein; and
    said second device including a receptacle portion defining a chamber surrounded by an outer wall thereof, a radially shrinkable protrusion outwardly projecting in a center portion of the chamber; wherein
    when assembled, the body of the plug portion is received within the chamber under the condition that the protrusion is received within the cavity, and wherein due to confinement of the outer wall, the body of the plug portion is inwardly compressed, and then successively inwardly compresses the inner protrusion of the receptacle portion so that the body is deformed to be in a converging configuration and the protrusion is deformed with thereof a narrower waist which cooperates with the outer wall to sandwich the body therebetween.

9. The assembly as claimed in claim 8, wherein a plurality of ribs integrally outwardly redially extend from the body for engagement with the outer wall.

10. The assembly as claimed in claim 8, wherein a plurality of spaced grooves are axially formed in the protrusion.

11. The assembly as claimed in claim 8, wherein only the plug portion extends through the through hole.

* * * * *